Patented July 29, 1947

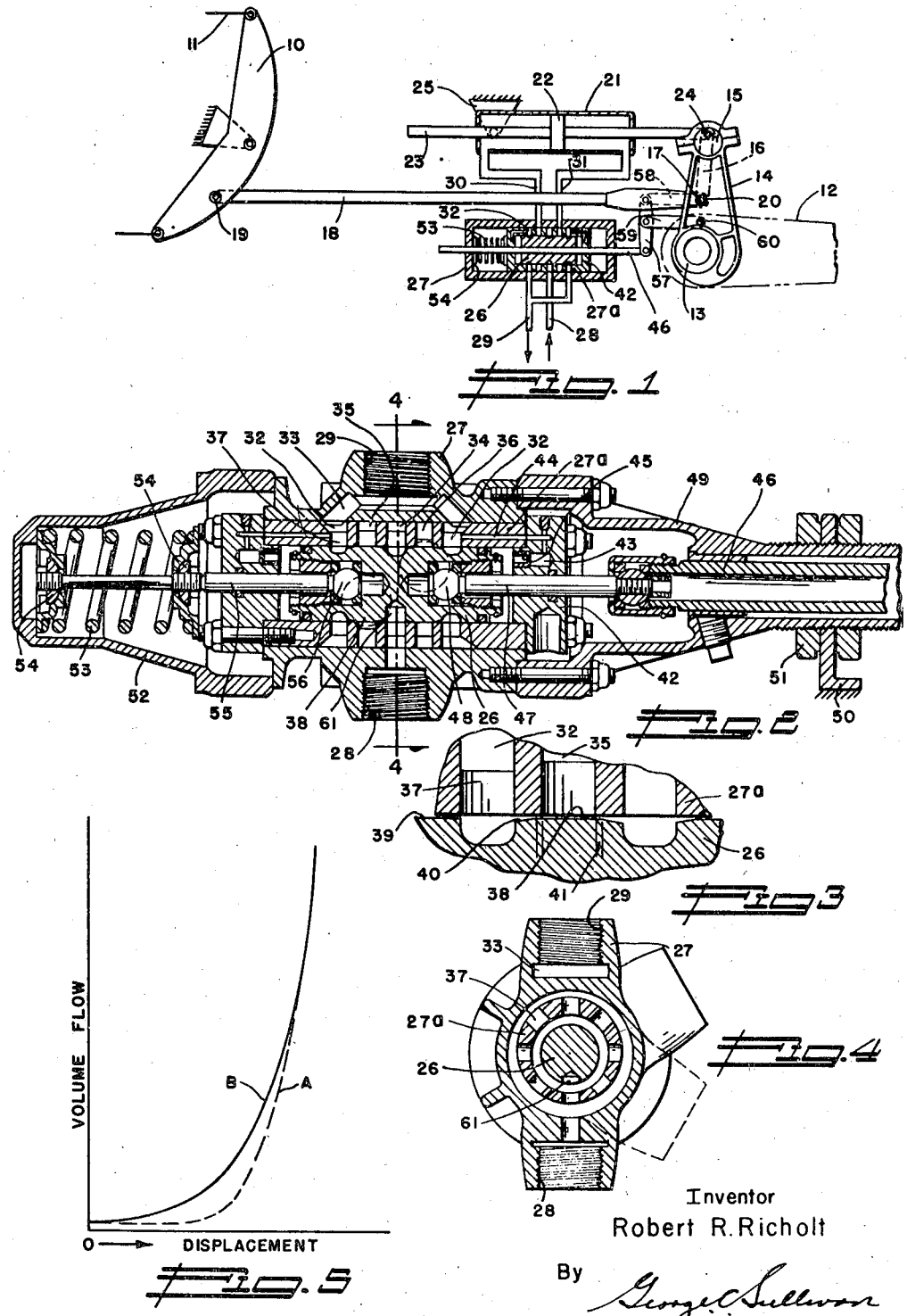

2,424,901

UNITED STATES PATENT OFFICE 2,424,901

VALVE FOR PRESSURE FLUID SERVOMOTORS

Robert R. Richolt, Tujunga, Calif., assignor to Lockheed Aircraft Corporation, Burbank, Calif.

Application August 9, 1943, Serial No. 498,021

6 Claims. (Cl. 121—46.5)

The present inventoin relates to power aided or servo boost systems for moving the aerodynamic control surfaces of large airplanes, and has special reference to hydraulic booster controls to help the pilot to move such heavily loaded control surfaces, while retaining a proportional feel or reaction of the forces acting on such surfaces.

In order that the pilot may retain the feel of the controls, and thus avoid inadvertent application of excessive forces thereon, the controls must be reversible, i. e., forces on the surface must be able to restore the pilot's control to neutral upon release. It is therefore necessary that he provide a portion of the force required to move or hold the control surfaces displaced, the remaining force to be supplied by the power or servo mechanism which is appropriately called a booster since it augments the pilot's strength in proportion to the effort he puts forth. A percentage or proportional boost, not necessarily linear, is desirable since it thus converts the control feel of a big airplane into the accustomed feel of a smaller airplane without boost, so that the aerodynamic controls of the big airplane do not involve learning a new set of reactions or control responses. The boost ratio or feel for the various control surfaces should be of course adjustable or variable for different installations, for example, a greater boost ratio may be desirable on the rudder, depending on the aerodynamic design of the airplane, while the ailerons and elevators might require lesser boosts. As an example, a 50,000 pound airplane of fairly high speed might require the pilot to supply 30% of the elevator hinge moment and only 9% of the rudder hinge moment. Thus the power booster would supply 70% of the elevator control force and 91% of the rudder control force.

An outstanding defect in such power booster systems as heretofore proposed is that of feed back and over control and hunting of the control surfaces. Since both the hydraulic lines and mechanical parts of such systems have some elasticity, the response to a control movement is apt to over-run the desired point, so that the booster will reverse itself and thus produce self-energizing powered oscillations about the desired control setting. Such oscillations of the control surfaces transmit confusing reactions back through the pilot's control or feel mechanism, which ordinarily serves to transmit the manually produced proportion of the hinge moment, as well as initiating the operation of the booster controls. Moreover, such powered oscillations or hunting is capable of destroying the airplane if the natural period thereof approximately coincides with flutter inducing aerodynamic disturbances such for example as are apt to occur in the wake of the propellers.

A further serious defect in such boost systems is that any friction in the hydraulic control valve and feel mechanism leading to the pilot's control position introduces stiffness or false feel into the controls, and any elasticity in the system contributes to the lag or lack of immediate coordinated response of the controls. Friction in a long mechanical cable system is unavoidable and introduces a false feel that may amount to 10 pounds or more at the pilot's position, to which must be added the friction and oscillation damping provisions in the hydraulic valve which may need to be as much as 20 pounds to overcome oscillatory or self-induced motoring in the control surface system. Also some valve lap is required to assure a working seal in the hydraulic valve controlling the booster, which introduces an out of phase relationship between the pilot's control and the surface, resulting in lost motion or an out of phase relationship at the pilot's control, which must be moved several degrees in the reverse direction to initiate reversal of motion in the control surface.

It is accordingly an object of this invention to provide an improved and simplified hydraulic booster control for aerodynamic control surfaces whereon a direct mechanical feel bar linkage is remotely operated by the pilot to operate the booster control valve through a distortable parallelogram linkage interconnecting the booster cylinder piston rod and the control surface lever or crank, the piston rod having an eccentric connection relative to a feel lever forming part of the parallelogram linkage, which feel lever is in turn pivoted in the control surface; the eccentricity of the piston rod connection relative to the feel lever connection determining the boost ratio, which ratio is readily changed by merely substituting a feel lever with a different eccentricity, so that the booster system of this invention is readily changed to accommodate various desired boost ratios without altering the basic structure and arrangement of the power cylinder and control valve.

It is a further object of this invention to provide an improved and simplified boost control system for the purposes described wherein the hydraulic control valve is given a dashpot effect to reduce or eliminate self-energized or powered oscillations in the boost system, and in which smooth operation of the boost system is obtained both by modulation of the flow through the valve, and by a material reduction in friction in the valve, with a resulting increase in sensitivity and responsiveness of the control surfaces to pilot control movements.

It is also an object of this invention to provide an improved and simplified hydraulic booster control system wherein the booster mechanism can be mounted adjacent the surface to be controlled, without requiring the use of flexible hydraulic lines or hoses, the reliability of which is not certain.

Other and further important objects of this invention will be apparent from the disclosures in the specification and the accompanying drawing.

This invention is shown in a preferred form, as applied to the rudder controls of an airplane, but it will be understood that my invention may be applied to other control surfaces with only minor alterations such as a change in the boost ratio, and the latter may either increase or decrease in proportion to the angular movement of the control surface.

On the drawings:

Figure 1 is a schematic diagram of a booster system embodying the features of this invention, wherein the pilot supplies a percentage of the power required to operate the control system and the booster supplies the balance as energized by the movement of the pilot's control.

Figure 2 is an enlarged control section of the booster control valve of this invention.

Figure 3 is a greatly enlarged fragmentary section of the control valve piston porting arrangements showing the modulating effect obtained by beveling the overlapping lands of the piston.

Figure 4 is a section on the line 4—4 of Figure 2 showing the several pipe connections to the valve.

Figure 5 is a chart illustrating the modulating effect of predetermined leakage and the beveled lands on the piston which together render the valve more sensitive and responsive to control movements.

As shown in the drawings—

The booster system chosen for illustrative purposes is intended to be located adjacent to the controlled surface for direct mechanical operation thereof, and is therefore controlled from the pilot's station by means of conventional rudder pedals (not shown) which operate a walking beam 10 by means of a conventional cable system the terminals 11 of which are attached to the walking beam. The control surface to be operated is shown as a rudder 12 pivoted about its axis 13 by a lever 14 to which both the walking beam and booster system are mechanically linked, as will now be described.

The free end of the lever 14 has a bearing to receive a hub 15 of a feel lever 16 the free end of which is shown as underlying the lever 14 and having a pivotal connection 17 to a feel bar 18 the other end 19 of which is connected to the walking beam. The movement of the free end of the lever 16 relative to the lever 14 is limited by the walls of an enlarged aperture 20 in the lever 14 which serve as stops for the projecting ends of the pivotal connection 17, so that when pilot force is applied to the walking beam, the feel bar 18 transmits this force to the lever 14 and so can directly operate the same upon failure of the booster system. Ordinarily, the slight relative movement of the connection 17 in the aperture 20 is utilized to move the valve controlling the application of the power boost.

A power cylinder 21 has a piston 22 carried by a piston rod 23 reciprocable therein, the latter being eccentrically connected at 24 to the hub 15 of the feel lever. In order to avoid the need of a crosshead in the piston rod the cylinder is preferably pivoted at 25 to the airplane structure. From the geometry of the feel lever 16 and the eccentric connection of the piston rod thereto it will be evident that the percentage of feel will be inversely proportional to the eccentricity of the connection 24 relative to the axis of the hub 15. Since a change in this eccentricity will change the boost ratio or percent of feel transmitted through the feel lever to the feel bar and thence to the walking beam and back to the pilot, it is a simple matter to substitute another lever 16 with a different eccentricity of the connection 24 in order to render the booster system applicable to installations requiring different amounts of boost.

With the foregoing arrangement, the operation of the feel bar by the pilot rotates the feel lever about its hub and moves the control valve in the opposite direction, through the parallelogram linkage, thus energizing the booster cylinder and piston rod 23. The eccentric connection of the rod 23 in the hub 15 tends to both move the rudder lever 14 and the feel lever 16, the division of the forces being determined by the eccentricity of the connection. Thus if the boost effect is intended to be 90%, then 90% of the booster power is applied to the rudder and 10% returned through the feel lever 16 and feel bar 18 to the pilot control so that the latter must be held in the desired position by a sustained force equivalent to 10% of the force or hinge moment applied to the rudder. The direction of movement of the booster piston rod is such as to return the feel lever 16 to its neutral position, after displacement of the lever 16 by the pilot's control simultaneously resetting the control valve to neutral, as will now be described.

A four-way hydraulic valve piston 26 has its body 27 arranged with separate supply 28 and return or sump 29 hydraulic connections, as well as connections 30 and 31 to either end of the power cylinder 21, the valve piston functioning to distribute power fluid from the supply connection 28 to either end of the power cylinder through one of the connections 30 or 31 while simultaneously connecting the other connection 31 or 30 to the return or sump connection 29. To this end the valve body 27 is provided with an inserted sleeve 27ª having a series of five grooves eccentrically turned therein, the end grooves 32 having their position of maximum eccentricity or depth arranged in alignment with passages 33 in the body 27 leading into the sump connection 29 while the center groove 34 is similarly offset and arranged for direct connection to the supply connection 28. The two remaining grooves 35 and 36 are arranged to respectively connect to the power cylinder connections 30 and 31. The four connections to the valve body 27 are conveniently staggered therearound, as shown in Figure 4, so that the maximum eccentricity of the several grooves varies accordingly, in order to facilitate fluid flow to and/or from each connection. By positioning the maximum depth of each groove at the point where the pipe connection is made to the valve body, the fluid velocities around the circumference of the groove become more nearly equal, facilitating fluid flow and eliminating tendencies to cavitation and turbulence in the flow. Each groove has a number of apertures 37 extending to the inner surface of their sleeve, and these apertures actually form the ports which are covered and uncovered by axial movement of the valve piston 26 within the sleeve.

The valve piston 26 is formed as a cylinder divided into four lands, of which the two center lands 38 control the ports leading to the several connections, and the two outer lands form dashpot pistons 39 as will be more fully described hereinafter. As shown in enlarged detail in Figure 3 the form of the center lands 38 is an important feature of this invention in that the edges of the lands are beveled as indicated at 40 to reduce the overlap 41 of the lands to the smallest practical amount in order to obtain a modulated response to even slight displacements of the piston from its center or neutral position. A predetermined slight continuous leakage from the center pressure or supply connection 28 accompanies this arrangement due to the high pressure on the hydraulic system and the working clearances necessary for non-binding action of the valve, this leakage being represented by the initial ordinate in the chart of flow vs. piston movement shown in Figure 5. An advantage of this predetermined leakage is that local chilling of the hydraulic fluid, during periods of inactivity of the control, is avoided, the entire unit being kept in condition for promp response to control movement. It will be noted that such leakage does not build up pressure to make the booster system self-energizing, since in the central position of the valve this leakage is equally directed to both of the power cylinder connection grooves, and from these grooves to the sump grooves.

The sleeve 27ª is held in position in the valve body by end closures 42 having return passages 43 therein which communicate with passages 44 in the sleeve leading to the sump grooves, with a restricted orifice plug 45 in the passage 43, thus converting the chambers between the outer lands 39 and the closures 42 into dashpots to dampen motoring of the valve due to reactions from the control surfaces. The amount of damping can be readily changed by substitution of a different orifice plug. The valve piston is reciprocated in the sleeve by means of a rod or stem 46 indirectly connected to the feel lever 16 as will be presently described, the rod 46 having an intermediate link 47 passing through the end closures 42 with ball ends 48 mounted in the rod 46 and the end of the valve piston 26, both ball ends being so mounted as to compensate for misalignment to eliminate as much friction in the valve as possible, since alignment of the valve piston 26, end closure 42 and the rod 46 have been found to be difficult if not impossible to obtain even with close manufacturing tolerances, as well as the wide temperature range encountered under aircraft flight conditions. The rod 46 is guided in an end closure 49 which serves to adjustably support the entire valve in a bracket 50 by suitable adjustments of nuts 51 on the threaded end of the closure 49, this adjustment being provided for initially setting the valve linkage in its mid or neutral position relative to the booster linkage, as evidenced by the central location of pivot 17 in the enlarged hole 20. Such adjustment is further facilitated by inserting a suitable pin through the pressure connection 28 into a pilot hole 61 in the central groove in the valve to positively position the same during the adjustment of the nuts 51. The other end of the valve body has an end closure 52 containing a double acting centering spring 53 having oppositely disposed adjustable spring seats 54 on a second link 55 having a ball seat 56 in the valve piston 26, the arrangement being such as to compress the spring 53 upon displacement of the valve in either direction from center.

The valve stem 46 is connected by a distortable quadrilateral linkage to the pivotal connection 17 between the feel lever 16 and the feel bar 18. This linkage comprises a vertical lever 57 pivoted at one end to the rod 46 and at the other to a horizontal link 58 which latter is in turn pivoted to the connection mentioned, which at the mid point of the vertical lever 57, a second horizontal link 59 is pivoted, which at its other end is connected to the rudder lever 14 at 60. Thus the fourth side of the quadrilateral linkage is indirectly formed by the movable feel lever 16 and the connection 60 to the rudder lever, whereby relative pivoting of the lever 16 serves to distort the quadrilateral linkage to move the valve stem 46 and valve 26 to energize the booster system.

In the diagram of flow vs. piston movement in Figure 5, only the flow in response to motion in one direction from the central or neutral position is shown, as the curves for both directions of motion are symmetrical. In this figure, curve A represents the flow control by a valve piston without the modulating effect of the beveled lands 40, while curve B shows the increased responsiveness, due to the modulated valve lands, and flow at the beginning of the valve displacement. A comparison of equal flow ordinates of the two curves near the neutral point of the valve will make evident the greatly increased sensitivity of the valve of this invention at small displacements representative of slight control and rudder movements, the reversibility of the booster response being very much better in a valve having the characteristics of curve B. Since the extreme range of movement of the valve is desirably less than three-eighths of an inch from one extreme to the other, it will thus be seen that the rudder booster will promptly respond to minor movements of the pilots control as well as promptly reverse, with a minimum phase shift analogous to backlash or lost motion in a mechanical linkage.

It will thus be seen that I have invented an improved and simplified hydraulic booster control system for the purpose described having a direct mechanical feel or feed back to the pilot's control and in which the booster has an increased sensitivity and responsiveness to pilot control movements due to modulation of the flow through the control valve of the booster.

Having thus described my invention and the present preferred embodiments thereof, I desire to emphasize the fact that many modifications may be resorted to in a manner limited only by a just interpretation of the following claims.

I claim as my invention:

1. In a control system for aircraft having a hydraulic operating cylinder for operating a control element, a control for the operating cylinder valve comprising a body hydraulically interconnected to the operating cylinder and having supply and return fluid connections thereto, a sleeve inserted in said valve body and having a series of spaced eccentric channels therein isolated from each other and respectively in communication at their points of maximum eccentricity with the several cylinder supply and return fluid connections to the body, said channels each communicating through ports with the interior of said sleeve, a piston valve reciprocable within said sleeve and having intermediate beveled lands controlling the distribution of fluid through said ports and channels, end lands on said piston valve, end closures for said sleeve for locating the sleeve in the body and having restricted passages to said return connection whereby to form dashpots in cooperation with the end lands on the piston valve, and means for moving said piston valve to energize the operating cylinder, said means including means compensating for lateral and angular misalignment.

2. In a control system for aircraft having a hydraulic operating cylinder for operating a control element, a control for the operating cylinder valve comprising a body hydraulically interconnected to the operating cylinder and having supply and return fluid connections thereto, a sleeve inserted in said valve body and having a series of spaced channels therein isolated from each other and respectively in communication with the several cylinder supply and return fluid connections to the body, said channels each communicating through ports with the interior of said sleeve, a piston valve reciprocable within said sleeve and having intermediate beveled lands controlling the distribution of fluid through said ports and channels, end lands on said piston valve, end closures for said sleeve having restricted passages to said return connection whereby to form dashpots in cooperation with the end lands on the piston valve, means for moving said piston valve to energize the operating cylinder, said means including means compensating for lateral and angular misalignment and a double acting spring adapted to return said piston valve to its center position.

3. In a control system for aircraft having a hydraulic operating cylinder for operating a control element, a control for the operating cylinder valve comprising a body hydraulically interconnected to the operating cylinder and having supply and return fluid connections thereto, a sleeve inserted in said valve body and having a series of spaced channels therein isolated from each other and respectively in communication with the several cylinder supply and return fluid connections to the body, said channels each communicating through ports with the interior of said sleeve, a piston valve reciprocable within said sleeve and having intermediate beveled lands controlling the distribution of fluid through said ports and channels, end lands on said piston valve, end closures for said sleeve having restricted passages to said return connection whereby to form dashpots in cooperation with the end lands on the piston valve, and a double acting spring adapted to return said piston valve to its center position.

4. In a control system for aircraft having a hydraulic operating cylinder for operating a control element, a control for the operating cylinder valve comprising a body hydraulically interconnected to the operating cylinder and having supply and return fluid connections thereto, a sleeve inserted in said valve body and having a series of spaced channels therein isolated from each other and respectively in communication with the several cylinder supply and return fluid connections to the body, said channels each communicating through ports with the interior of said sleeve, a piston valve reciprocable within said sleeve and having intermediate beveled lands controlling the distribution of fluid through said ports and channels, end lands on said piston valve, end closures for said sleeve having restricted passages to said return connection whereby to form dashpots in cooperation with the end lands on the piston valve and means for adjusting said valve body longitudinally to vary the neutral position of the piston valve relative to the control system.

5. In a hydraulic booster control system for aircraft, a power cylinder and a four way valve for controlling the same, including suitable hydraulic supply and return connections to the valve and interconnections from the valve to the power cylinder, said valve comprising a body sleeve therein defining a central bore therethrough, said sleeve having a series of spaced ports therethrough separately communicating with said hydraulic connections, end closures for said sleeve having restricted passages communicating with the return connection, a piston valve reciprocable within said sleeve and having a pair of intermediate lands controlling the several ports and end lands cooperating with the end closures to form dashpots, and means for moving said piston in said sleeve including a ball ended link journaled in one of said end closures and having a limited lateral freedom of movement in said piston whereby to compensate for lateral and angular misalignment.

6. In a hydraulic booster control system for aircraft, a power cylinder and a four way valve for controlling the same, including suitable hydraulic supply and return connections to the valve and interconnections from the valve to the power cylinger, said valve comprising a body sleeve therein defining a central bore therethrough, said sleeve having a series of spaced ports therethrough separately communicating with said hydraulic connections, end closures for said sleeve having restricted passages communicating with the return connection, a piston valve reciprocable within said sleeve and having a pair of intermediate lands controlling the several ports and end lands cooperating with the end closures to form dashpots, and means for moving said piston in said sleeve including a ball ended link journaled in one of said end closures and having a limited lateral freedom of movement in said piston whereby to compensate for lateral and angular misalignment, a second ball ender link similarly journaled in the other end closure and attached to said piston, and resilient means associated with said second link and adapted to center said valve.

ROBERT R. RICHOLT.

REFERENCES CITED

The following references are of record in the file of this patent:

UNITED STATES PATENTS

| Number | Name | Date |
|---|---|---|
| 265,226 | Garrison | Sept. 26, 1882 |
| 283,226 | Elliott | Aug. 14, 1883 |
| 743,985 | Koelkebeck | Nov. 10, 1903 |
| 754,467 | Lombard | Mar. 15, 1904 |
| 1,343,024 | Bark | June 8, 1920 |
| 1,365,347 | Schneider | Jan. 11, 1921 |
| 1,600,542 | Gagg | Sept. 21, 1926 |
| 1,790,620 | Davis | Jan. 27, 1931 |
| 1,817,180 | Drake | Aug. 4, 1931 |
| 1,851,816 | Dieter | Mar. 29, 1932 |
| 1,930,827 | Searle | Oct. 17, 1933 |
| 1,987,505 | Edler | Jan. 8, 1935 |
| 2,001,318 | Spence | May 14, 1935 |
| 2,140,037 | Swisher | Dec. 13, 1938 |

(Other references on following page)

UNITED STATES PATENTS

| Number | Name | Date |
|---|---|---|
| 2,141,697 | Russell | Dec. 27, 1938 |
| 2,172,981 | Maglott | Sept. 12, 1939 |
| 2,227,273 | Price | Dec. 31, 1940 |
| 2,227,375 | Carlson | Dec. 31, 1940 |
| 2,265,546 | Price | Dec. 9, 1941 |
| 2,272,725 | Overbeke | Feb. 10, 1942 |
| 2,284,298 | Newton | May 26, 1942 |
| 2,307,585 | | |
| 2,337,706 | | |

| Number | Name | Date |
|---|---|---|
| | Harrington | Jan. 5, 1943 |
| | Berry | Dec. 28, 1943 |

FOREIGN PATENTS

| Number | Country | Date |
|---|---|---|
| 522,647 | Germany | Apr. 18, 1931 |
| 130,213 | Great Britain | July 31, 1919 |
| 378,453 | Italy | Feb. 10, 1940 |
| 401,937 | France | Aug. 10, 1909 |